H. C. McCURRIE.
MACHINE FOR CUTTING AND PITTING DRUPACEOUS FRUIT.
APPLICATION FILED JULY 30, 1917.

1,286,685.

Patented Dec. 3, 1918.
3 SHEETS—SHEET 3.

WITNESS:

INVENTOR.
Hugh C. McCurrie
BY
Strong & Townsend
ATTORNEYS.

UNITED STATES PATENT OFFICE.

HUGH C. McCURRIE, OF SAN FRANCISCO, CALIFORNIA.

MACHINE FOR CUTTING AND PITTING DRUPACEOUS FRUIT.

1,286,685.                    Specification of Letters Patent.    Patented Dec. 3, 1918.

Application filed July 30, 1917. Serial No. 183,434.

*To all whom it may concern:*

Be it known that I, HUGH C. McCURRIE, a citizen of the United States, residing at the city and county of San Francisco and State of California, have invented new and useful Improvements in Machines for Cutting and Pitting Drupaceous Fruit, of which the following is a specification.

This invention relates to machines for cutting and pitting drupaceous fruits, such as peaches; and has for its object to simplify and improve the construction and operation of the same.

In carrying out this object, I employ a reciprocating arm to grasp the fruit and carry it to position to be operated upon by the cutting and pitting mechanism, which latter comprises, generally, a stationary blade, upon which the fruit is placed, a movable blade opposed to the stationary blade which descends upon the fruit and presses down upon the same to cause the fruit to be cut by both blades to the depth of the pit, transversely, opposed blades at each end of the machine movable toward and from each other to sever the fruit centrally on the sides untouched by the first mentioned blades, pins movable back and forth to pierce the severed halves of the pulp and carry them away from the pit, and means to hold the pit in place while the severed halves are being removed.

One form which my invention may assume is exemplified in the following description and illustrated in the accompanying drawings, in which—

Figure 1:
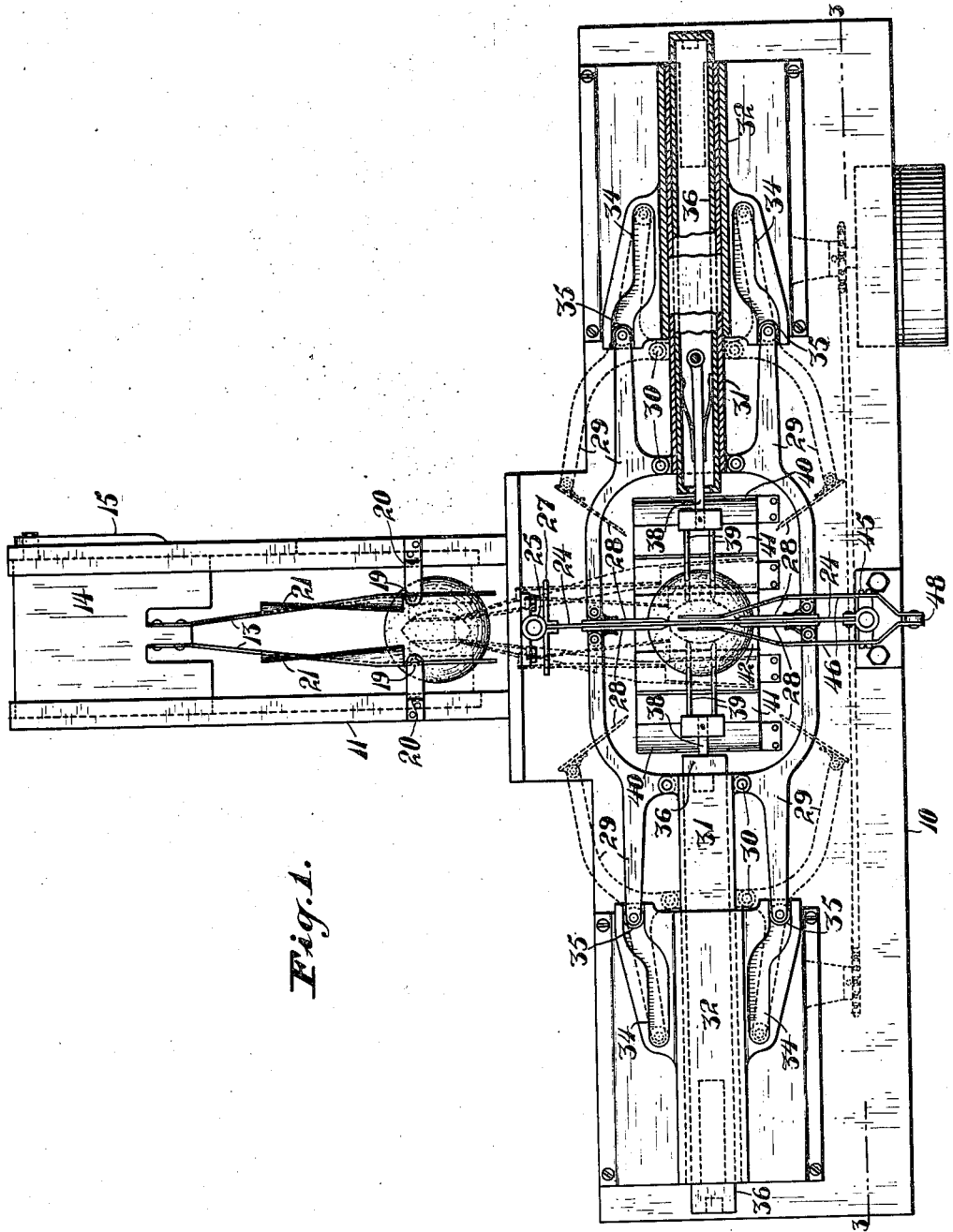
Figure 1 shows a plan view of a device embodying my invention.
Figure 2:
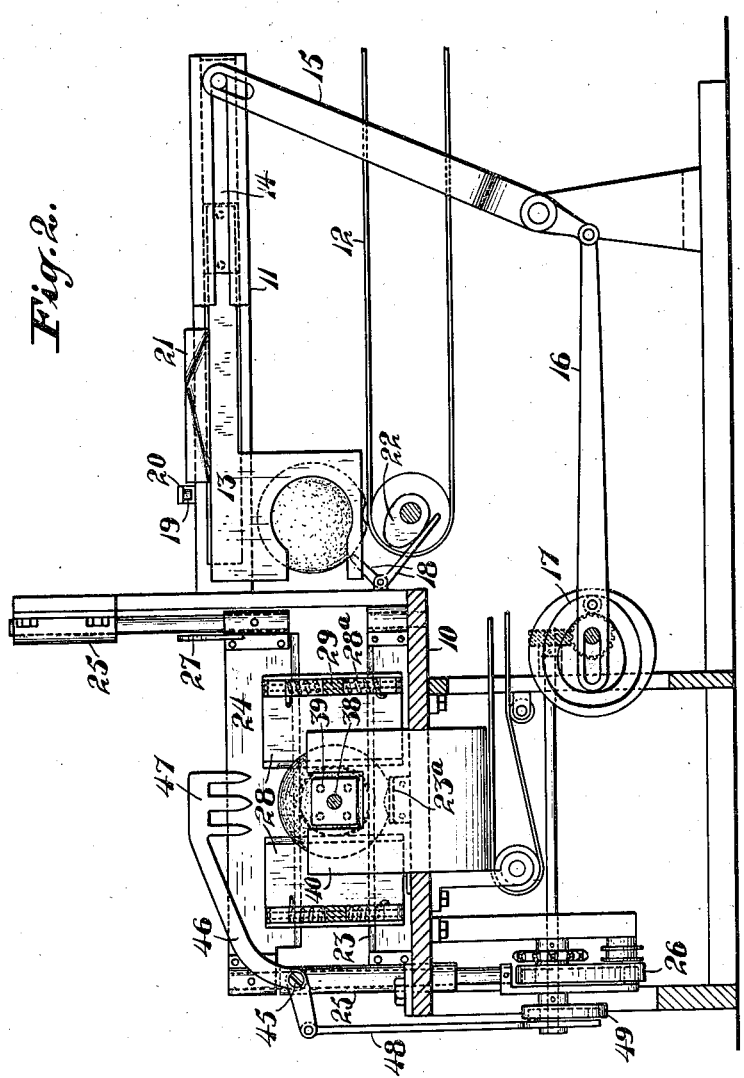
Fig. 2 shows an end elevation of the same, partly in section.
Figure 3:
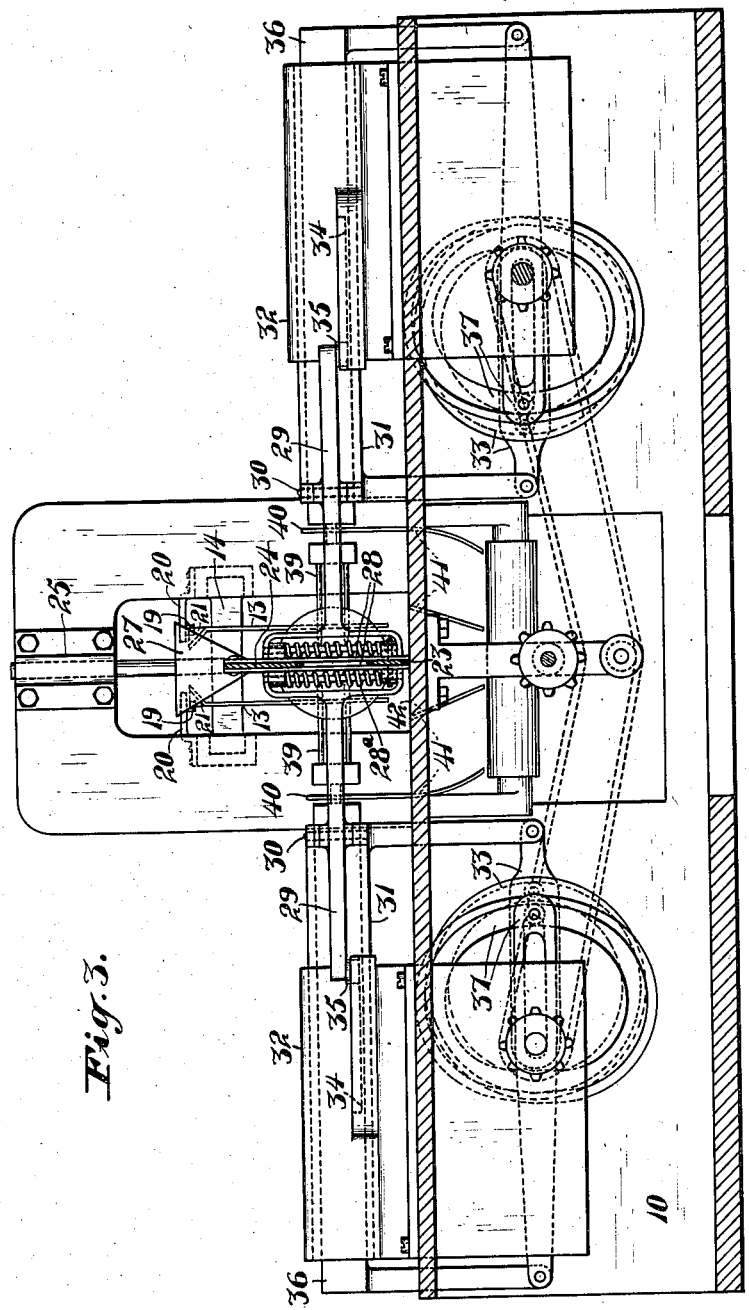
Fig. 3 shows a sectional view, taken on the line 3—3 of Fig. 1.

The particular machine here shown and described has a main frame 10, with a right-angular extension 11, which latter supports an endless traveling belt 12, by means of which the fruit is fed to the machine. Overlying the belt is a pair of spring metal gripper arms 13, carried on a slidable blade 14, reciprocated by a rock-arm 15 and connecting rod 16, the latter being actuated by a cam device 17.

The fruit is carried by the belt to a position where a bent lever 18 will hold it against further movement, and the gripper arms returning from a forward position will be held apart by pins 19 on straps 20, said pins engaging with extensions 21 on the arms, which extensions are made to diverge outwardly. When the gripper arms are opposite the fruit the extensions 21 ride off the pins 19, whereupon the arms are allowed to move toward each other and engage the fruit. Then when the arms are ready to move forwardly on a subsequent operation an eccentric block 22 trips the bent lever 18 and frees the fruit for forward movement. The extensions 21 do not at this time engage the pins 19 and hence the arms 13 retain the fruit until reaching the center of the machine, where they deposit it upon a stationary blade, 23, arranged preferably in a plane parallel with the line of feeding movement of the fruit.

To secure the best results in cutting and pitting the fruit, it is important that the same should be delivered in a certain position, that is to say, in the case of a peach where the pit is oval and comparatively flat the major axis of the pit should be disposed in a vertical plane and in line with the severing blades about to be described.

After the fruit is properly positioned, a movable blade 24, vertically slidable in bearings 25 and actuated by a cam mechanism 26, descends upon the same in a position opposed to and above the stationary blade and presses down upon the fruit until both blades have severed the pulp of the fruit centrally to the depth of the pit, at which point the fruit strikes a limiting block 23ᵃ at its base. Coincidently with the descent of the blade 24 a V-shaped block 27 carried thereby descends between the gripper arms 13 in engagement with the extensions 21 and spreads said arms apart to release the fruit therefrom and permit the arms to be moved outwardly for receiving another article.

Thereafter vertically disposed severing devices, in the form of a pair of blades 28 at each end of the main frame, are actuated to sever the fruit centrally at the sides untouched by the horizontal blades 23 and 24, thereby practically dividing the fruit into halves. These vertical severing blades are each pivoted on the end of a lever arm 29, fulcrumed at 30 upon a slidable member 31 working in a bearing 32 and reciprocated by cam mechanism 33. The lever arms of each pair of blades are transversely spaced at each end of the main frame and are movable toward and from each other by means of a stationary cam track 34 in which a roller 35, on the end of the lever, works. A spring 28ᵃ on the hinge or pivot retains each blade 28 in an obtuse angular position relatively to its arm.

When the actuating mechanism moves the slidable members 31 toward each other the blades 28 contact at their forward ends with the blades 23—24, and being hinged swing into parallel relation and at the same time are moved inwardly toward the fruit by the rollers 35 working in the cam tracks 34. The result is that the fruit is severed centrally at the sides in line with the retaining blades, thus dividing the fruit in two halves or at least so nearly so as to permit ready separation of the halves, as will presently appear.

The slidable member 31 is preferably made hollow, and mounted within the same is a second slidable member 36 reciprocated by means of cam mechanism 37. At the inner end of each of the slidable members 36 is a rod 38, preferably connected flexibly thereto and carrying at its outer end a set of pins 39 to pierce the adjacent half of the fruit when moved inwardly.

At the center of the machine is a vertically rocking member fulcrumed at 45 and having an arm 46 disposed on each side of the blade 24 with a forked member 47 at its end overlying the fruit. The forked member 47 is especially provided to insure that broken pieces of seed will be held and separated from the halves of the fruit, thus insuring that the split fruit will be properly cleaned. A rod 48, connected to suitable actuating mechanism 49, operates said rocking member to move its forked ends downwardly to engage the pit of the fruit just before the severing blades and tines start to draw away.

In operation, after the fruit has been severed, as above described, the blades 28 start to move away and in so doing the springs 28ᵃ cause them to be angled in a manner to wedge the halves of the pulp slightly apart. At this time, and before the horizontal blade 24 starts to ascend, the forked members 47 are moved downwardly to pass through the rift in the fruit and engage the pit so that the latter will be held in place. Thereafter the blade 24 may ascend and the pins 39 then move outwardly. The pulp being cut centrally, entirely around its perimeter, and to a great extent dislodged from its pit, the separating movement of the pins will carry the two halves away, leaving the pit between the forked members and bottom blade.

A guard 40 is positioned on the machine and arranged to permit the pins 39 to pass through but capable of engaging with the portion of the fruit carried thereby to push the same off from the tines and allow it to drop below through an opening 41 onto a conveyer or receptacle. When the forked members 47 are raised, the pit gripped thereby will be released and fall below through an opening 42.

By severing the fruit on a line coincident with the major axis of the pit, indicated by a furrow or depression running around the fruit, the severed halves draw away from the pit with comparatively little resistance, inasmuch as the strongest affinity between the pulp and pit is at the rim of the latter where a kind of a seam is formed.

Having thus described my invention, what I claim and desire to secure by Letters Patent is—

1. In a fruit cutting and pitting machine, opposed means capable of cutting the pulp at the top and bottom and retaining the fruit in place, and opposed severing devices for cutting the fruit centrally at the sides not touched by the retaining means.

2. In a fruit cutting and pitting machine, opposed means capable of cutting the pulp at the top and bottom and retaining the fruit in place, opposed severing devices for cutting the fruit centrally at the sides not touched by the retaining means, and reciprocating devices for piercing the severed halves of the fruit and withdrawing them from the pit.

3. In a fruit cutting and pitting machine, a stationary blade, means to position the fruit upon said blade, a movable blade opposed to the stationary blade and descending upon the fruit and pressing down upon the same to cause the pulp to be cut by both blades at the top and bottom and the fruit retained between them, and means to sever the fruit centrally at the sides untouched by the pit retaining blades.

4. In a machine of the character described, sets of vertically and horizontally reciprocating cutting blades arranged with their cutting edges in parallel relation to each other, pitting devices operating in a common plane with one of said sets for engaging the pit of a fruit while being severed, and reciprocating feed means adapted to coöperate with said pitting devices to positively engage and properly position the fruit in cutting relation to the blades.

5. In a machine of the character described, cutting and pitting devices for drupaceous fruits, means to position the fruit relative thereto from an outside source, comprising a pair of spring-pressed gripper arms having openings therethrough to provide centering pockets for the opposite sides of the fruit, and means for reciprocating the same.

6. In a machine of the character described, cutting and pitting devices for drupaceous fruits, means to position the fruit relative thereto from an outside source, comprising a pair of spring-pressed gripper arms having centering openings for receiving and holding fruits of different diameters, means for reciprocating the same, and means for spreading the arms to release the fruit after the same has been positioned.

7. In a machine of the character described, cutting and pitting devices for drupaceous fruits, means to position the fruit relative thereto from an outside source, comprising a pair of spring-pressed gripper arms having centering openings for receiving and holding fruits of different diameters, means for reciprocating the same, said arms being normally retracted, and means engageable therewith on their return to spread them apart for receiving another article of fruit.

8. In a fruit cutting and pitting machine, means for cutting the pulp on opposite sides and retaining the fruit in place, and opposed blades movable toward each other to sever the fruit centrally on the sides not touched by the retaining means.

9. In a fruit cutting and pitting machine, means for cutting the pulp on opposite sides and retaining the fruit in place, and opposed blades movable toward each other to sever the fruit centrally on the sides not touched by the retaining means, said blades being arranged in pairs, the pairs being movable toward and from each other and the blades of each pair being movable also toward and from each other.

10. In a fruit cutting and pitting machine, means for cutting the pulp on opposite sides and retaining the fruit in place, blades movable toward each other to sever the fruit centrally on the sides not touched by the retaining means, said blades being arranged in pairs, the pairs being movable also toward and from each other, and actuating mechanism for said blades comprising a reciprocating carrier for each pair of blades, a lever arm connecting each blade with its carrier, and a stationary cam track for guiding said lever arms.

11. In a fruit cutting and pitting machine, means for cutting the pulp on opposite sides and retaining the fruit in place, opposed blades movable toward each other to sever the fruit centrally on the sides not touched by the retaining means, and pins movable back and forth to pierce the severed halves of the fruit and carry them away from the pit.

12. In a fruit cutting and pitting machine, opposed blades above and below the fruit for cutting the same centrally to the depth of the pit, and opposed blades at the sides of the fruit for cutting the same centrally on a line with said first-mentioned cutting means.

13. In a fruit cutting and pitting machine, a main frame, a stationary blade at the central portion thereof, a horizontally reciprocating carrier at each end of the main frame movable toward and from the center, a pair of blades on each carrier movable toward and from each other and meeting at the center of the machine in a manner to sever the fruit centrally on opposite sides, a vertically reciprocating blade disposed above the stationary blade for pressing downwardly on the fruit whereby to cause the top and bottom thereof to be severed to the depth of the pit, and horizontally reciprocating tines at each end of the main frame movable toward and from the fruit to pierce the severed halves of the latter and withdraw them from the pit.

14. In a fruit cutting and pitting machine, a main frame, a stationary blade at the central portion thereof, a horizontally reciprocating carrier at each end of the main frame movable toward and from the center, a pair of blades on each carrier movable toward and from each other and meeting at the center of the machine in a manner to sever the fruit centrally on opposite sides, a vertically reciprocating blade disposed above the stationary blade for pressing downwardly on the fruit whereby to cause the top and bottom thereof to be severed to the depth of the pit, horizontally reciprocating tines at each end of the main frame movable toward and from the fruit to pierce the severed halves of the latter and withdraw them from the pit, and means to feed the fruit into the machine at one side thereof and place it on the stationary blade, said means being released when the vertically movable blade descends.

15. In a fruit cutting and pitting machine, reciprocating means to sever the pulp of the fruit centrally throughout its perimeter, means entering the rift cut into the fruit to engage the opposite sides of the pit and retain the same in place after the cutting operation, and means to withdraw the severed halves of the pulp away from the pit thus retained.

16. In a fruit cutting and pitting machine, means to sever the pulp of the fruit centrally throughout its perimeter, means to engage the pit to retain the same in place, and other means to withdraw the severed halves of the pulp away from the retained pit, said pit engaging means comprising movable gripping means working in close relation with the severing means and passing through the rift made by the latter.

17. In a fruit cutting and pitting machine, vertically spaced horizontal blades relatively movable to sever the pulp at the top and bottom, and a pair of transversely spaced vertical blades at each end movable into engagement with the horizontal blades and then toward each other to sever the fruit at the sides in line with the top and bottom rifts.

18. In a fruit cutting and pitting machine, vertically spaced horizontal blades relatively movable to sever the pulp at the top and bottom, and a pair of transversely spaced vertical blades at each end movable into engagement with the horizontal blades and then toward each other to sever the fruit at the sides in line with the top and bottom rifts, said vertical blades being hingedly supported and spring-pressed so as to cause a wedging apart of the severed halves of the pulp as the blades are moved away.

19. In a fruit cutting and pitting machine, vertically spaced horizontal blades relatively movable to sever the pulp at the top and bottom, a pair of transversely spaced vertical blades at each end movable into engagement with the horizontal blades and then toward each other to sever the fruit at the sides in line with the top and bottom rifts, said vertical blades being hingedly supported and spring-pressed so as to cause a wedging apart of the severed halves of the pulp as the blades are moved away, means for retaining the pit of the fruit against movement, and means for drawing the severed and dislodged halves of the pulp away from the retained pit.

In testimony whereof I have hereunto set my hand in the presence of two subscribing witnesses.

HUGH C. McCURRIE.

Witnesses:
JOHN H. HERRING,
W. W. HEALEY.